US008437358B2

(12) United States Patent
Shin et al.

(10) Patent No.: US 8,437,358 B2
(45) Date of Patent: May 7, 2013

(54) METHOD OF UPLINK IP PACKET FILTERING CONTROL IN MOBILE TERMINAL

(75) Inventors: Jae Wook Shin, Daejeon-si (KR); Kwang-Ryul Jung, Daejeon-si (KR); Ae-Soon Park, Daejeon-si (KR)

(73) Assignees: Samsung Electronics Co., Ltd., Suwon-si (KR); Electronics and Telecommunications Research Inst., Daejeon (KR)

( * ) Notice: Subject to any disclaimer, the term of this patent is extended or adjusted under 35 U.S.C. 154(b) by 287 days.

(21) Appl. No.: 12/744,628

(22) PCT Filed: May 22, 2008

(86) PCT No.: PCT/KR2008/002854
§ 371 (c)(1),
(2), (4) Date: May 25, 2010

(87) PCT Pub. No.: WO2009/069867
PCT Pub. Date: Jun. 4, 2009

(65) Prior Publication Data
US 2010/0254399 A1 Oct. 7, 2010

(30) Foreign Application Priority Data
Nov. 27, 2007 (KR) ........................ 10-2007-0121604

(51) Int. Cl.
*H04L 12/28* (2006.01)
(52) U.S. Cl.
USPC ........................................................ 370/415
(58) Field of Classification Search .................. 370/224, 370/338, 349, 389, 415
See application file for complete search history.

(56) References Cited

U.S. PATENT DOCUMENTS

| | | | |
|---|---|---|---|
| 7,079,499 B1 * | 7/2006 | Akhtar et al. .................. | 370/310 |
| 7,324,498 B2 | 1/2008 | Ahn et al. | |
| 7,372,840 B2 | 5/2008 | Le et al. | |
| 7,684,396 B2 | 3/2010 | Kim et al. | |
| 7,907,524 B2 * | 3/2011 | Willars et al. ................. | 370/230 |
| 8,090,380 B2 * | 1/2012 | Islam et al. .................... | 455/450 |
| 8,094,644 B2 * | 1/2012 | Ludwig et al. ................ | 370/349 |
| 8,271,686 B2 * | 9/2012 | Jouppi et al. .................. | 709/246 |
| 2004/0205247 A1 | 10/2004 | Ahn | |
| 2007/0042757 A1 | 2/2007 | Jung et al. | |

FOREIGN PATENT DOCUMENTS

| | | |
|---|---|---|
| EP | 1 705 859 A1 | 9/2006 |
| KR | 10-2003-0063799 A | 7/2003 |
| KR | 10-2004-0075582 A | 8/2004 |

(Continued)

*Primary Examiner* — Dang Ton
*Assistant Examiner* — Nourali Mansoury
(74) *Attorney, Agent, or Firm* — Jefferson IP Law, LLP (57) ABSTRACT

A method for controlling uplink IP packet filtering in a mobile terminal in a 3GPP Evolved Packet System (EPS) is provided, including an information receiving operation of receiving IP address information allocated to user equipment, and filtering information required for delivering an uplink IP packet received from the user equipment; and a filtering operation for determining which packet data network and a bearer the IP packet is delivered to, based on the IP address information and the filtering information. In a 3GPP evolved packet system supporting a default bearer function, a packet data network to which an uplink IP packet is delivered and a bearer identifier can be efficiently determined when the user equipment simultaneously accesses one or more packet data networks and is allocated several IP addresses, resulting in effective uplink packet filtering.

8 Claims, 6 Drawing Sheets

FOREIGN PATENT DOCUMENTS

| | | |
|---|---|---|
| KR | 10-2006-0090291 A | 8/2006 |
| KR | 10-2007-0021022 A | 2/2007 |
| KR | 10-2007-0060995 A | 6/2007 |
| WO | 03/069842 A1 | 8/2003 |
| WO | 2006/071155 A1 | 7/2006 |
| WO | 2007/079773 A1 | 7/2007 |

\* cited by examiner

METHOD OF UPLINK IP PACKET FILTERING CONTROL IN MOBILE TERMINAL

TECHNICAL FIELD

The present invention relates to IP packet filtering in a mobile communication terminal, and more particularly, to a method for controlling uplink IP packet filtering in a mobile terminal in a 3rd Generation Partnership Project (3GPP) Evolved Packet System (EPS).

This work was supported by the IT & R&D program of Ministry of Information and Communication (MIC)/Institute for Information Technology Advancement (IITA) [2005-S-404-23, Research & development on Mobile Terminal Technology based on 3G Evolution].

BACKGROUND ART

In general, a 3GPP evolved packet system (EPS) is a packet-optimized mobile communication system supporting faster data transmission and lower transmission delay than a conventional 3GPP mobile communication system. The 3GPP EPS allows users to receive high-speed mobile multimedia service.

The 3GPP EPS necessitates an optimized radio transmission technique, an optimized control plane signaling, and an optimized radio access network, as well as a different bearer and service control model from the conventional 3GPP mobile communication system.

In the conventional 3GPP mobile communication system, packet filtering includes uplink packet filtering performed in a terminal, and downlink packet filtering performed in a core network gateway.

Packet filtering includes parsing header information of an IP packet to detect a service data flow to which the IP packet belongs, and ultimately causing the IP packet to be mapped to a bearer corresponding to the service data flow. Packet filtering primarily uses 5-tuples of an IP packet (i.e., a source IP address, a destination IP address, a protocol identifier, a source port number, and a destination port number).

The evolved packet system supports an 'always on' function by a default bearer, unlike the conventional 3GPP mobile communication system. That is, when initially attempting to access a network for registration, a terminal establishes a Non-Guaranteed Bit Rate (Non-GBR) bearer as a default bearer, and performs basic IP signaling and application signaling through the established bearer, which minimizes a latency for packet transmission and a setup time for a service requiring establishment of a dedicated bearer.

In the evolved packet system, a terminal is allowed to access one or more packet data networks simultaneously, and establishes a default bearer for each packet data network. The terminal is allocated one or more prefix (or subnet)-based IP addresses from a specific packet data network to access the packet data network for packet transmission and reception.

Meanwhile, the terminal is required to establish a separate dedicated bearer to perform a more stringent quality of service, e.g., Guaranteed Bit Rate (GBR) service, than default bearer service. In general, packet filter information for identifying a service data flow mapped to the dedicated bearer corresponds to the dedicated bearer. Information for uplink packet filtering performed in the terminal is delivered as a Traffic Flow Template (TFT) from a network to the terminal at a time when a dedicated bearer and a session are established.

However, specific packet filter information is not provided for the default bearer, which is just used as a wild card. That is, a dedicated bearer corresponding to a packet is searched using the packet filter information, and when there is no corresponding dedicated bearer, the packet is decided to correspond to the default bearer.

Thus, when the terminal accesses one or more packet data networks simultaneously and an uplink packet does not correspond to a dedicated bearer, there may be several available default bearers that may correspond to the packet, because there is a default bearer established for each packet data network.

Determination of a bearer corresponding to an uplink packet which should be mapped to a default bearer requires a packet filter matching task to be performed on all dedicated bearers in advance, which may cause increasing filtering time and delayed packet transmission.

DISCLOSURE OF INVENTION

Technical Problem

The present invention is directed to a method for filtering an IP packet that is capable of effectively controlling packet filtering, in which a bearer management module having an uplink packet filtering function in a 3GPP evolved packet system stores packet filtering information for identifying multiple packet data networks and bearers, and filters the packet using the packet filtering information.

Technical Solution

The present invention discloses a method of controlling uplink IP packet filtering, including: an information receiving operation of receiving IP address information allocated to user equipment, and filtering information required for delivering an uplink IP packet received from the user equipment; and a filtering operation of determining a bearer and a packet data network to which the IP packet received from the user equipment is delivered, based on the IP address information and the filtering information.

The filtering operation may include checking a source IP address of the received IP packet, and searching for a packet data network matching the source IP address or a prefix thereof when the source IP address is an IPv4 or global IPv6 address.

The filtering operation may include checking a source IP address of the received IP packet, and searching for the packet data network matching an interface identifier included in the source IP address when the source IP address is a link-local IPv6 address.

The filtering operation may include checking a source IP address of the received IP packet, and checking if an address allocation type for the user equipment is dynamic-stateful autoconfiguration and there is a packet data network having no IP address currently allocated to user equipment when the source IP address is not allocated yet.

The filtering information may include an access point name (APN) for identifying a packet data network accessed by the user equipment, a version of an IP address currently allocated to the user equipment, an IP address allocation type, a flag indicating whether the IP address is currently allocated to the user equipment, an allocated IP address and an interface identifier which are allocated to the user equipment when the IP address is currently allocated to the user equipment, and uplink packet filter information corresponding to each dedicated bearer established in the user equipment.

Additional features of the invention will be set forth in the description which follows, and in part will be apparent from the description, or may be learned by practice of the invention.

It is to be understood that both the foregoing general description and the following detailed description are exemplary and explanatory and are intended to provide further explanation of the invention as claimed.

Advantageous Effects

According to the present invention, in a 3GPP evolved packet system supporting a default bearer function, a packet data network to which an uplink IP packet is delivered and a bearer identifier can be efficiently determined when a terminal, i.e., user equipment simultaneously accesses one or more packet data networks and is allocated several IP addresses, resulting in effective uplink packet filtering.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF MAJOR SYMBOL IN THE ABOVE FIGURES

110: User equipment (UE)
120: Evolved Universal Terrestrial Radio Access Network (E-UTRAN)
130: Mobility Management Entity (MME)
140: Home Subscriber Server (HSS)
150: Serving Gateway (S-GW)
160a: Packet Data Network Gateway (P-GW)
170a: Packet data network.

MODE FOR THE INVENTION

The invention is described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art.

Figure 1:
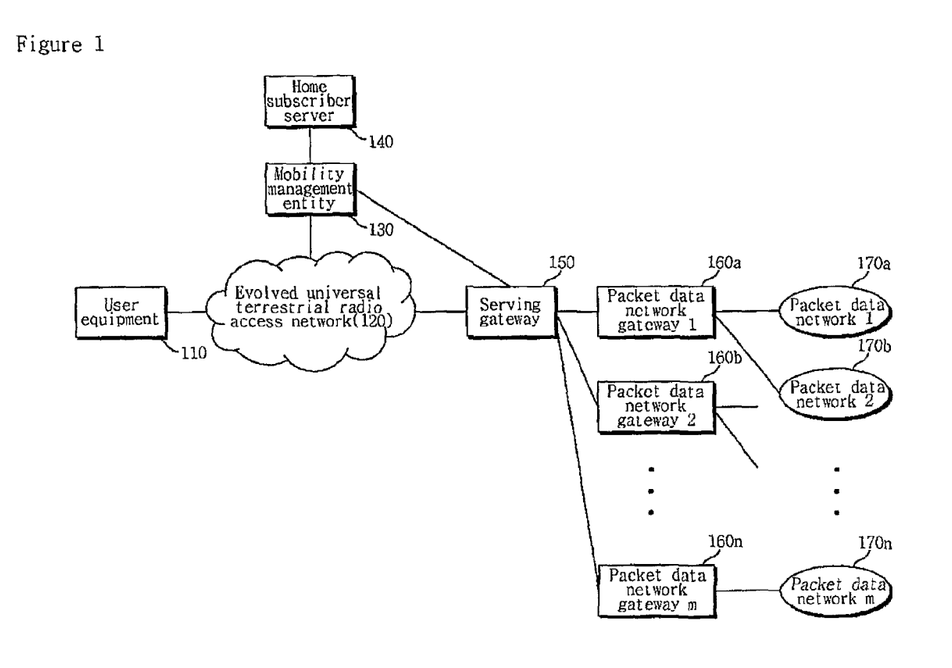
FIG. 1 is a block diagram illustrating the configuration of a 3GPP evolved packet system network.

FIG. 1 is a block diagram illustrating the configuration of a 3GPP evolved packet system network.

An evolved packet system (EPS) includes a terminal, i.e., user equipment (UE) 110, an Evolved Universal Terrestrial Radio Access Network (E-UTRAN) 120, a Mobility Management Entity (MME) 130, a Serving Gateway (S-GW) 150, Packet Data Network Gateways (P-GWs) 160a, 160b, . . . and 160n, and a Home Subscriber Server (HSS) 140.

The UE 110 may control services and bearers through a signaling process performed with the E-UTRAN 120 and the MME 130, and simultaneously access one or more packet data networks 170a, 170b, . . . and 170m for service reception.

The EPS includes one or more P-GWs 160a, 160b, . . . and 160n, each providing a connection to one or more packet networks. For example, the P-GW 160a controls a connection to the packet data network 170a and the packet data network 170b.

The S-GW 150 selects the P-GW connected to the packet data network to be accessed by the UE 110, which uses an Access Point Name (APN) to identify such a packet data network.

Meanwhile, the MME 120 controls the services and the bearers through a signaling process performed with the UE 110.

Figure 2:
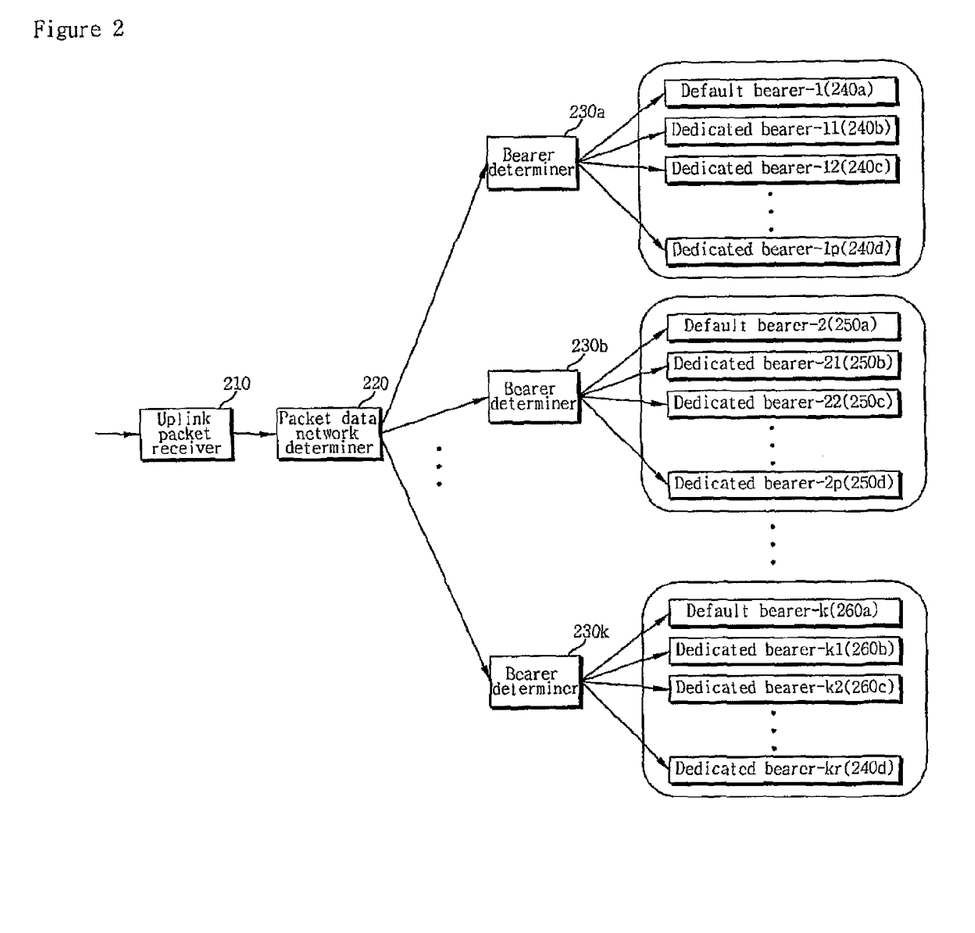
FIG. 2 illustrates 2-step uplink IP packet filtering according to an exemplary embodiment of the present invention.

FIG. 2 illustrates 2-step uplink IP packet filtering according to an exemplary embodiment of the present invention.

While the UE 110 is receiving services by accessing one or more packet data networks, it is allocated different IP addresses from the packet data networks. That is, the UE 110 is allocated the IP addresses from the respective packet data networks, which provide the services to the UE 110. The IP address may be either an IPv4 address or an IPv6 address. The UE 110 may be simultaneously allocated two types of IP addresses from one packet data network according to applications.

The IPv4 address consists of a subnet and a host identifier, and the IPv6 address consists of a prefix and an interface identifier. The subnet or the prefix is defined for each packet data network.

The UE may establish one or more bearers for each packet data network, and the bearers include default bearers 240a, 250a, and 260a that are basically established when addresses are allocated to the UE attempting to access the respective packet data networks; and dedicated bearers 240b, 240c, 240d, 250b, 250c, 250d, 260b, 260c, and 260d that are additionally established in response to a request for Quality of Service (QoS) in providing services.

An IP packet filtering process will now be described in more detail with reference to FIG. 2. When an uplink packet receiver 210 in the UE receives an uplink packet, a packet data network determiner 220 determines which packet data network the packet is delivered to. This process is called packet filtering or packet classification.

Bearer determiners 230a, 230b, and 230c determine which bearer for the determined packet data network the packet will be delivered through. The dedicated bearers bear respective packet filter information for each packet data network. This allows the dedicated bearer corresponding to respective packet filters to deliver a packet matching the packet filter.

In other words, when the uplink packet is received by the UE, packet filtering is performed in two operations A first operation determines which packet data network the received packet is delivered to, based on the UE s IP header information, and a second operation determines which bearer for the packet data network the packet is delivered through.

Figure 3:
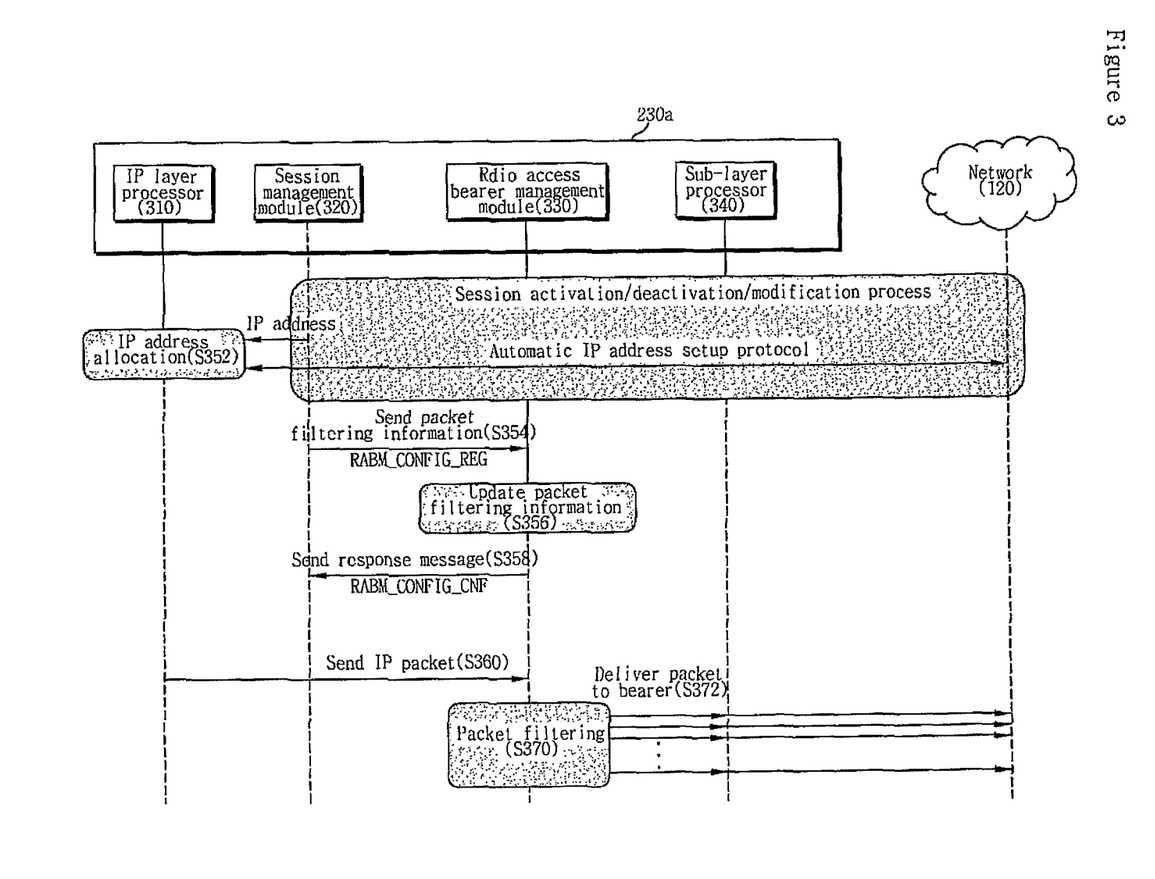
FIG. 3 is a signal flow diagram illustrating a process of filtering an uplink IP packet according to an exemplary embodiment of the present invention.

FIG. 3 is a signal flow diagram illustrating a process of filtering an uplink IP packet according to an exemplary embodiment of the present invention.

In an EPS using a network control-based service model, uplink packet filter information is delivered from the network 120 to the UE 110 in a service session activation, deactivation, or modification process (S350).

First, if a newly activated service session is a first session to a specific packet data network, an IP address for accessing the packet data network is allocated to the UE (S352). The IP address allocation is performed through a session management protocol message by a Session Management (SM) module 320 in the session activation process, or through communication with the network 120 using an IP protocol signaling process, such as IPv6 Router Solicitation & Advertisement, Dynamic Host Configuration Protocol (DHCP), or Mobile IPv4 (MIPv4) after session activation.

If the IP address is allocated by the session management protocol message in the session activation process (S350), the SM module 320 sets, in an IP layer processor 310, the IP address received from the network 120. If the IP address is allocated by the IP protocol such as DHCP or MIPv4, the network 120 performs a session modification process to send the allocated IP address to the UE via the session management message (S350).

Upon receipt of the IP address information or the information required for uplink packet filtering through the session management protocol, the SM module 320 sends the packet filtering information to a radio access bearer management module on a user plane using a RABM_CONFIG_REQ primitive (S354).

The radio access bearer management module 330 updates and stores the received IP address and packet filtering information (S356), and sends a response message RABM_CONFIG_CNF to the SM module 320 (S358). When receiving the IP packet from the IP layer processor 310 (S360), the radio access bearer management module 330 performs filtering on the uplink packet (S370) and sends the resultant uplink packet to a bearer so that a sub-layer processor 340 delivers the same (S372).

Figure 4:
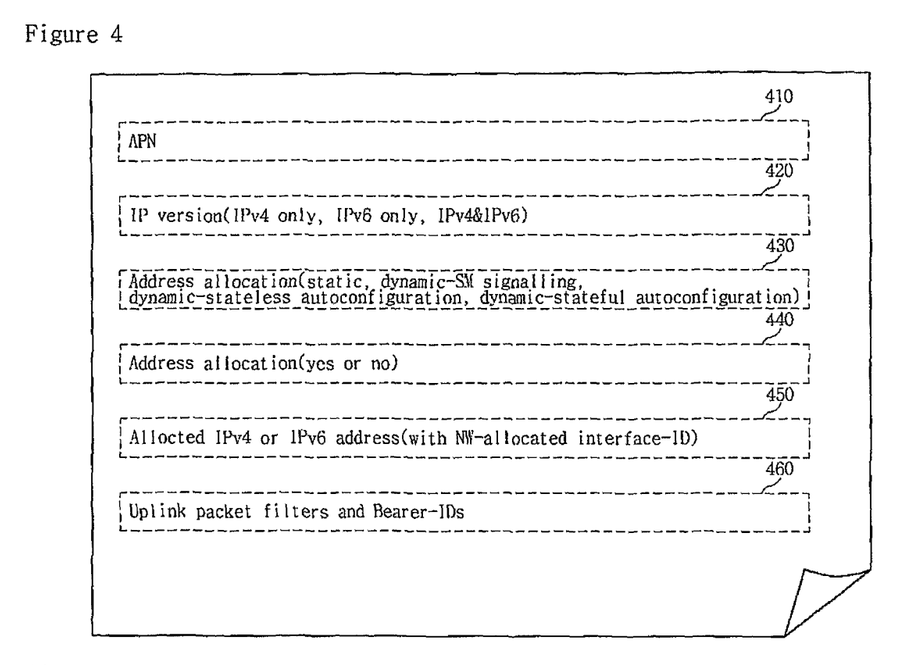
FIG. 4 illustrates an example of filtering information required for uplink IP packet filtering according to an exemplary embodiment of the present invention.

FIG. 4 illustrates an example of filtering information required for uplink IP packet filtering according to an exemplary embodiment of the present invention.

The filtering information required for uplink IP packet filtering includes an Access Point Name (APN) 410 for identifying each packet data network currently accessed by the UE, and a version 420 of the IP address allocated to the UE. The IP version 420 includes IPv4 only, IPv6 only, and IPv4&IPv6.

The filtering information further includes IP address allocation type information 430 indicating an IP address allocation type (e.g., static, dynamic-SM signaling, dynamic-stateless autoconfiguration, and dynamic-stateful autoconfiguration).

The filtering information further includes a flag 440 indicating whether an IP address is currently allocated to the UE, an allocated IP address 450 and an interface identifier, and packet filter and bearer identifier information 460 for uplink packet filtering.

Figure 5:
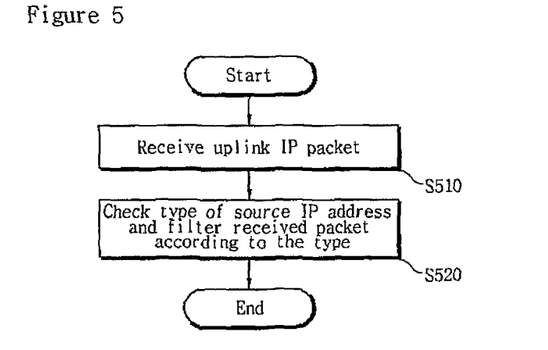
FIG. 5 is a flowchart illustrating a method for filtering an uplink IP packet according to an exemplary embodiment of the present invention.

FIG. 5 is a flowchart illustrating a method for filtering an uplink IP packet according to an exemplary embodiment of the present invention.

The method for filtering an uplink IP packet according to the present invention will now be described in brief. First, an uplink IP packet is received (S510). A type of a source IP address is then checked and the uplink IP packet is filtered according to the type of the source IP address (S520). That is, the packet data network and the bearer are determined based on the filtering information described in FIG. 4 for delivery of the received IP packet.

Figure 6:
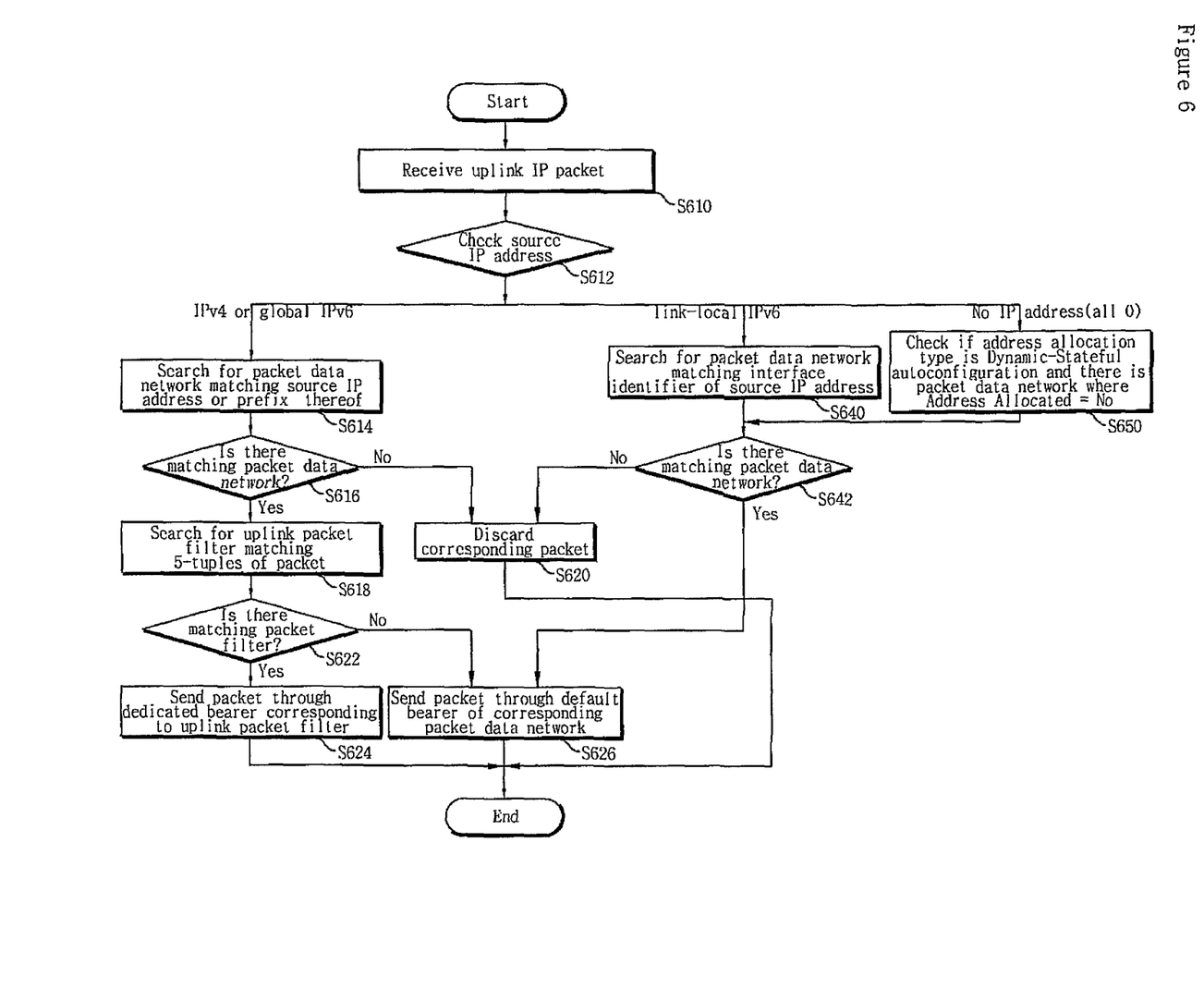
FIG. 6 is a detailed flowchart of FIG. 5.

FIG. 6 is a detailed flowchart of FIG. 5.

A process of filtering an IP packet according to an exemplary embodiment of the present invention will be described in more detail with reference to FIG. 6. Upon receipt of an uplink IP packet (S610), the UE checks a source IP address of the received IP packet (S612).

If the source IP address is an IPv4 or global IPv6 address, the UE searches for a packet data network matching the source IP address or a prefix thereof (S614). In this case, an IP address allocated to the UE by each packet data network is used (S614). The UE determines whether there is a packet data network having an IP address currently allocated to the UE or a prefix thereof matching the source IP address of the uplink packet or the prefix thereof (S616).

If there is a matching packet data network, the UE searches for an uplink packet filter matching 5-tuples consisting of a source IP address, a destination IP address, a protocol identifier (or, a next header value), and source and destination port numbers in an IP packet header (S618).

The UE determines whether there is a matching packet filter (S622). If there is a matching uplink packet filter, the UE sends the uplink IP packet through a corresponding dedicated bearer (S624).

If it is determined in operation 5622 that there is no matching uplink packet filter, the UE sends the IP packet through a default bearer of the packet data network (S626).

Meanwhile, if it is determined in operation 5616 that there is no packet data network matching the uplink packet, the UE discards the corresponding IP packet (S620).

If it is determined in operation 5612 that the source IP address of the uplink IP packet is a link-local IPv6 address, the UE compares an interface identifier of the source IP address with an interface identifier allocated to the UE for each packet data network to search for a packet data network having a matching interface identifier (S640). The UE determines whether there is a packet data network having a matching interface identifier (S642), and if there is a packet data network having a matching interface identifier, the UE sends the uplink IP packet through a default bearer of the packet data network (S626), and if there is no packet data network having a matching interface identifier, the UE discards the uplink IP packet (S620).

If it is determined in operation 5612 that the source IP address of the uplink IP packet is set to 0, that is, the source IP address is not set, the UE checks if an address allocation type for the UE is a Dynamic-Stateful autoconfiguration and there is a packet data network having no IP address currently allocated to UE, that is, where Address Allocated=No (S650). And, the UE determines whether there is a matching packet data network (S642) to send the uplink IP packet through the default bearer of the corresponding packet data network (S626) or discard the uplink IP packet (S620).

Figure 7:
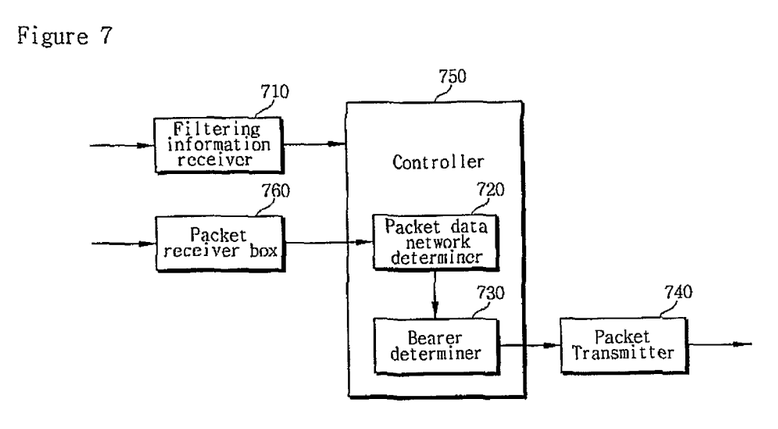
FIG. 7 is a block diagram illustrating the configuration of an uplink IP packet filtering apparatus according to an exemplary embodiment of the present invention.

FIG. 7 is a block diagram illustrating the configuration of an uplink IP packet filtering apparatus according to an exemplary embodiment of the present invention.

An uplink IP packet filtering apparatus includes a filtering information receiver 710, a controller 750, and a packet transmitter 740. The controller 750 includes a packet data network determiner 720 and a bearer determiner 730.

The filtering information receiver 710 receives IP address information allocated to the UE and filtering information required for delivering an uplink IP packet received from the UE. The filtering information includes an access point name (APN) for identifying a packet data network accessed by the UE, a version of an IP address currently allocated to the UE, an IP address allocation type, a flag indicating whether the IP address is currently allocated to the UE, an allocated IP address and an interface identifier which are allocated to the user equipment when the IP address is currently allocated to the user equipment, and uplink packet filter information corresponding to each dedicated bearer established in the UE.

The controller 750 determines a packet data network and a bearer to which the IP packet received from the UE is delivered, based on the IP address information and the filtering information.

More specifically, the packet data network determiner 720 checks a source IP address of the received IP packet. If the source IP address is an IPv4 or global IPv6 address, the packet data network determiner 720 searches for a packet data network matching the source IP address or a prefix thereof. If the source IP address is a link-local IPv6 address, the packet data network determiner 720 searches for a packet data network matching an interface identifier included in the source IP address. If the source IP address is not set, the packet data network determiner 720 checks if an address allocation type for the UE is dynamic-stateful autoconfiguration and there is a packet data network having no address currently allocated to the UE, and determines which packet data network the IP packet is sent to.

The bearer determiner 730 determines a bearer through which the IP packet is sent, based on the search result from the packet data network determiner 720. Specifically, the bearer determiner 730 checks if there is an uplink packet filter matching 5-tuples, such as a source IP address, a destination IP address, a protocol identifier, and source and destination port numbers, in the header of the received IP packet to determine the bearer. The method of determining the bearer has been described in more detail with reference to FIG. 6.

Through the determined packet data network and bearer, the packet transmitter 740 sends the received IP packet.

Meanwhile, the method for controlling uplink IP packet filtering may be implemented as a computer program. Codes and code segments of the program may be easily inferred by a computer programmer in the art. The program may be stored in a computer readable recording medium, and read and executed by the computer to implement the method for controlling uplink IP packet filtering. The information recording medium includes a magnetic recording medium, an optical recoding medium, and a carrier-wave medium.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Industrial Applicability

The present invention can be efficiently applied to the field of filtering an uplink IP packet delivered from user equipment to a network in a 3GPP evolved packet system (EPS) when the user equipment is performing service on one or more packet data networks.

The invention claimed is:

1. A method for controlling uplink IP packet filtering, comprising:
    an information receiving operation of receiving IP address information allocated to a user equipment, and filtering information required for delivering an uplink IP packet received from the user equipment; and
    a filtering operation of determining a packet data network and a bearer to which the IP packet received from the user equipment is delivered, based on the IP address information and the filtering information,
    wherein the filtering operation comprises:
    checking a source IP address of the received IP packet;
    checking if an address allocation type for the user equipment is dynamic-stateful autoconfiguration and there is a packet data network having no IP address currently allocated to the user equipment when the source IP address is not set;
    delivering the received IP packet through a default bearer when there is the packet data network as the check result; and
    discarding the received IP packet when there is no packet data network.

2. The method of claim 1, wherein the filtering information is received from the network as a session activation, deactivation, and modification process in session management protocol is performed in the user equipment.

3. The method of claim 1, wherein the IP address is automatically allocated from the network and received through a session management module in the user equipment.

4. The method of claim 1, further comprising storing the IP address information and the filtering information received.

5. The method of claim 1, wherein the filtering operation comprises checking a source IP address of the received IP packet, and searching for a packet data network matching the source IP address or a prefix thereof when the source IP address is an IPv4 or global IPv6 address.

6. The method of claim 5, wherein the filtering operation further comprises:
    when there is a matching packet data network, checking if there is an uplink packet filter matching 5-tuples in a header of the received IP packet, the 5-tuples including a source IP address, a destination IP address, a protocol identifier, and source and destination port numbers; and
    delivering the received IP packet through either a corresponding dedicated bearer or a corresponding default bearer.

7. The method of claim 1, wherein the filtering operation further comprises:
    checking a source IP address of the received IP packet;
    searching for a packet data network matching an interface identifier of the source IP address when the source IP address is a link-local IPv6 address;
    delivering the received IP packet through a default bearer when there is the matching packet data network; and
    discarding the received IP packet when there is no matching packet data network.

8. The method of claim 1, wherein the filtering information comprises an access point name (APN) for identifying a packet data network accessed by the user equipment, a version of an IP address currently allocated to the user equipment, an IP address allocation type, a flag indicating whether the IP address is currently allocated to the user equipment, an allocated IP address and an interface identifier which are allocated to the user equipment when the IP address is currently allocated to the user equipment, and uplink packet filter information corresponding to each dedicated bearer established in the user equipment.

* * * * *